UNITED STATES PATENT OFFICE.

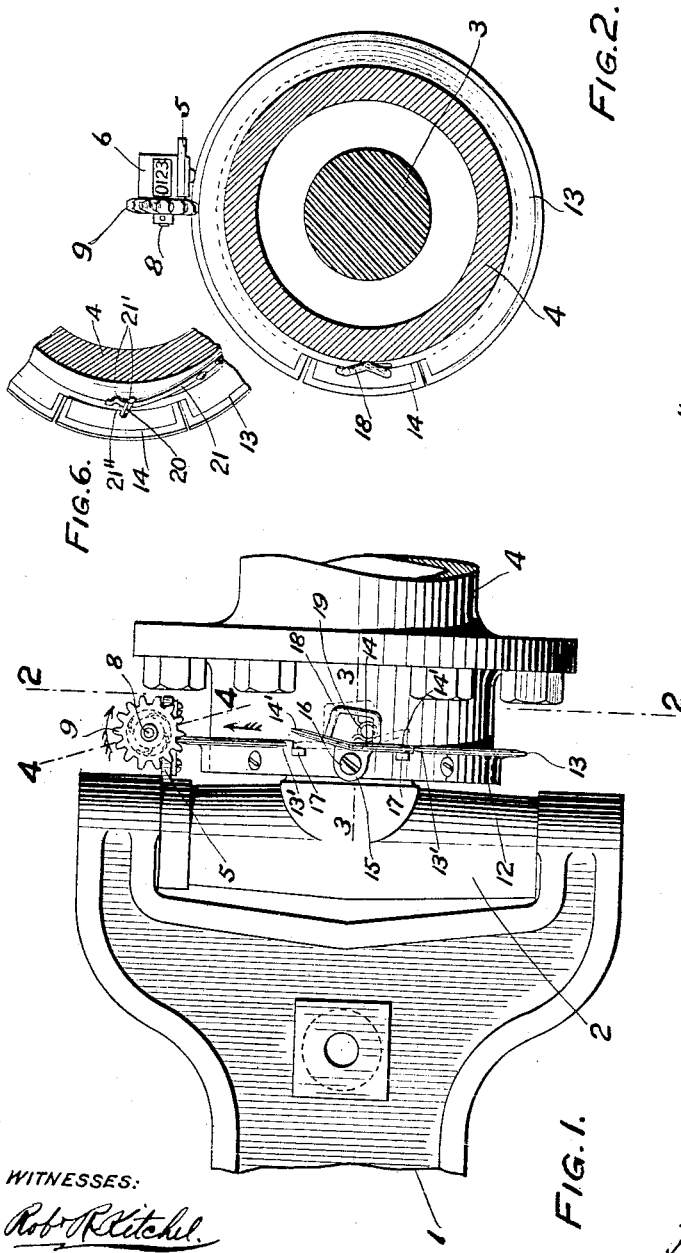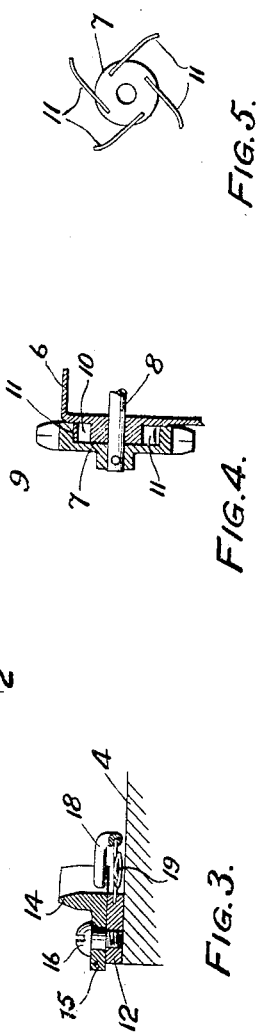

TRACY V. BUCKWALTER, OF ALTOONA, PENNSYLVANIA.

MECHANICAL MOVEMENT.

No. 926,238.

Specification of Letters Patent.

Patented June 29, 1909.

Application filed December 16, 1908. Serial No. 467,748.

*To all whom it may concern:*

Be it known that I, TRACY V. BUCKWALTER, a citizen of the United States, residing at Altoona, in the county of Blair and State of Pennsylvania, have invented certain Improvements in Mechanical Movements, of which the following is a specification.

My invention is a mechanical movement adapted for transforming reverse into continuous movements. It is designed primarily to provide a cyclometer that will operate continuously regardless of the direction of movement of the vehicle to which it is attached, whereby substantially the total distance of travel is indicated.

The characteristic features of the improvements are fully disclosed in the following description and the accompanying drawings in illustration thereof.

In the drawings, Figure 1 is a view in elevation representing my improvements applied to parts of a vehicle; Fig. 2 is a view taken on the line 2—2 of Fig. 1; Fig. 3 is a view taken on the line 3—3 of Fig. 1; Fig. 4 is a sectional view taken on the axis of the star wheel; Fig. 5 is a view of mechanism for preventing the reverse movement of the star wheel, and Fig. 6 is a perspective view showing the preferred means for holding the switch.

In the drawings I have represented the end of a beam or axle 1 having jointed therewith the knuckle 2 of a spindle 3 and revoluble on the spindle the wheel hub 4. An arm or bracket 5 on the knuckle 2 has fixed thereon the cyclometer register or indicator 6 having on the casing thereof the hub 7 and journaled therein the operating shaft 8. A star or spur wheel 9, having the hollow barrel 10, is fixed on the shaft, and springs 11, fixed to the hub 7, frictionally engage the interior cylindrical surface of the barrel 10, the springs being inclined at like angles to the respective radii which they intersect so that they prevent the movement of the star wheel oppositely to the direction of their extension. A ring 12, having thereon the circular rim or flange 13, is fixed to the hub 4 with the flange disposed to engage the star wheel, and in a gap between the terminals 13′ of this segmental flange 13 is an angular flange or cam 14 having thereon the lug 15 by which it is eccentrically connected to an arbor 16 fixed in relation to the ring 12. Stops 17, adjacent to the flange terminals 13′, are adapted for engaging the angularly disposed wings 14′ of the cam 14 to prevent them from moving past their respective positions of alinement with the terminals 13′ when the cam is switched from one position to the other.

As shown in Figs. 1 and 3, an arm 18 is fixed to the cam 14, extending oppositely to the lug 15, and fixed to the outer part of the arm is an end of the coiled spring 19 which has its opposite end fixed to the ring 12 at a distance from the outer connection less than that of the arbor; whereby the spring is expanded by and opposes the movement of the cam from one position to the other.

As shown in Fig. 6, a pin or arm 20 is fixed to the cam 14 and engages a spring 21 fixed to the wheel hub 4, the spring having at the free end thereof the depressions 21′ separated by the hump 21″ by which the arm may be engaged to hold the switch in either of the two positions to which it may be thrown.

It will be understood that the movable cam acts as a switch, engaging and moving the star wheel in the direction of the arrow thereon regardless of the direction of revolution of the revoluble part which carries the cam. When the hub 4 revolves in the direction of the arrow thereon the forward wing of the cam 14 is angularly disposed to the plane of the rim 13 and the rearward wing is in the plane of the rim. Consequently while the rim engages the star wheel the latter is held stationary and as the rim leaves its engagement the forward end of the angularly disposed cam wing engages the space of the star wheel adjacent to that left by the rim, whereby the star wheel is advanced a space and will be advanced an additional space for each additional revolution of the hub. When the movement of the hub is reversed the frictional resistance of the springs or pawls 11 upon the star wheel is sufficient to prevent the latter from turning in the reverse direction and to cause the cam to be thrown to the dotted line position against the resistance of the spring which normally holds it against movement. When the cam has been thrown, the revolution of the hub in this reverse direction will effect a movement of the star wheel in the direction of the arrow thereon through a space for each continuous revolution of the hub.

Having described my invention, I claim:

1. In apparatus of the class described, a revoluble device, a switch having angularly disposed members connected in rocking relation to said revoluble device, means for opposing resistance to the rocking of said switch, and mechanism operated by said switch, said mechanism being adapted for shifting said switch.

2. In apparatus of the class described, a revoluble device having a rim, a switch adapted for rocking in relation thereto and having ends adapted for registration with terminals of said rim, means for opposing resistance to the rocking of said switch, and mechanism operated by said switch, said mechanism being adapted for reversing said switch on reversing the revolution of said device.

3. In apparatus of the class described, a wheel, a switch pivotally connected to said wheel, means for opposing resistance to the rocking of said switch and indicating mechanism having a wheel adapted to be engaged by said switch, said wheel last named having means connected therewith for holding it against reverse movement whereby said switch is shifted on the reverse revolution of said wheel.

4. In apparatus of the class described, a wheel having a flange thereon, connected with said wheel a switch having angularly disposed flanges adapted to be brought into registration alternately with corresponding terminals of said flange first named, a spring opposing resistance to the rocking of said switch, and a toothed wheel adapted to be engaged by said flanges.

5. In apparatus of the class described, a wheel having a flange thereon, pivotally connected to said wheel a switch having terminals adapted to be brought into registration with terminals of said flange, a toothed wheel adapted to be engaged by said flange and switch, means for preventing the reverse movement of said toothed wheel, and registering mechanism operated by said wheel.

6. In apparatus of the class described, a wheel, a switch pivotally connected to said wheel, a toothed wheel adapted to be engaged and revolved by said switch regardless of the direction of revolution of said wheel first named, a pawl for preventing the reverse movement of said toothed wheel, and registering mechanism operated by said toothed wheel.

In witness whereof I have hereunto set my name this 8th day of Dec., A. D. 1908, in the presence of the subscribing witnesses.

TRACY V. BUCKWALTER. [L. S.]

Witnesses:
P. H. MARKLEY,
J. S. B. BUCK.